United States Patent [19]

Kishida et al.

[11] Patent Number: 4,877,844

[45] Date of Patent: Oct. 31, 1989

[54] PROCESS FOR PRODUCING A LOW GLOSS THERMOPLASTIC RESIN

[75] Inventors: Kazuo Kishida, Hiroshima; Yutaka Toyooka; Yoshiyuki Mikami, both of Ohtake, all of Japan

[73] Assignee: Mitsubishi Rayon Company Limited, Tokyo, Japan

[21] Appl. No.: 135,470

[22] Filed: Dec. 21, 1987

Related U.S. Application Data

[63] Continuation of Ser. No. 860,577, May 7, 1986, abandoned.

[30] Foreign Application Priority Data

May 10, 1985 [JP]  Japan .................................... 60-98035
Aug. 26, 1985 [JP]  Japan .................................. 60-187113

[51] Int. Cl.$^4$ ............................................ C08F 279/04
[52] U.S. Cl. ........................................ 525/316; 525/87
[58] Field of Search .................................. 525/316, 87

[56] References Cited

U.S. PATENT DOCUMENTS

| | | | |
|---|---|---|---|
| 3,442,979 | 5/1969 | Ott et al. ............................... | 525/316 |
| 3,663,656 | 5/1972 | Ford et al. ............................ | 525/316 |
| 4,012,462 | 3/1977 | Chaudhary ........................... | 525/316 |
| 4,221,883 | 9/1980 | Mott et al. ........................... | 525/246 |
| 4,703,090 | 10/1987 | Ferraresi et al. .................... | 525/316 |

FOREIGN PATENT DOCUMENTS 0171411  10/1983  Japan ..................................... 525/87

Primary Examiner—Wilbert J. Briggs, Sr.
Attorney, Agent, or Firm—Oblon, Spivak, McClelland, Maier & Neustadt

[57] ABSTRACT

A process for producing a low gloss thermoplastic resin which comprises polymerizing in two steps from 20 to 70 parts by weight of a butadiene polymer, at least 70% by weight of which is constituted by butadiene, with from 30 to 80 parts by weight of a total of from 15 to 40% by weight of a vinyl cyanide monomer and from 60 to 85% by weight of an aromatic vinyl monomer, characterized in that for the polymerization of the first step, the butadiene polymer, the vinyl cyanide monomer and the aromatic vinyl monomer were charged in amounts corresponding to from 20 to 80% by weight of the entire butadiene polymer, from 20 to 80% by weight of the entire vinyl cyanide monomer and from 20 to 80% by weight of the entire aromatic vinyl monomer, respectively, and after the completion of the polymerization of the first step, the rest of the butadiene polymer, the vinyl cyanide monomer and the aromatic vinyl monomer were charged for the polymerization of the second step.

7 Claims, No Drawings

PROCESS FOR PRODUCING A LOW GLOSS THERMOPLASTIC RESIN

This application is a continuation of application Ser. No. 860,577, filed on May 7, 1986, now abandoned.

The present invention relates to a process for producing a thermoplastic resin having a substantially low gloss as compared with conventional ABS resins and yet having excellent processability and impact resistance.

ABS resins have been used for various applications by virtue of their excellent molding processability, mechanical strength, chemical resistance and gloss. However, depending upon the particular purpose, all of these physical properties may not necessarily be required. For instance, for interior parts of automobiles, cameras, suit case housings, etc., it is desired to reduce the gloss or luster of the surface of a molded product, i.e. to obtain a so-called delustered surface, without bringing about a deterioration of other physical properties.

As methods for delustering thermoplastic resins, there may be mentioned (i) a method wherein talc, calcium carbonate or an oxide of lead or bismuth as shown in Japanese Examined Patent Publication No. 44582/1974 is blended to a thermoplastic resin, (ii) a method in which a rubber-modified thermoplastic resin as disclosed in Japanese Unexamined Patent Publications No. 383/1973, No. 10628/1973, No. 142259/1979, No. 133353/1981 and No. 161459/1984 is added, and (iii) a method wherein a rubber component as disclosed in Japanese Examined Patent Publications No. 25897/1969 and No. 2434/1973 and Japanese Unexamined Patent Publication No. 171411/1983 is added after the polymerization.

The above method (i) has an advantage that the process for the production is relatively simple. However, it has disadvantages that the degree of delustering is inadequate, a gloss appears when the product is molded at a high temperature, and the impact strength decreases substantially. The method (ii) has disadvantages such that the degree of delustering varies depending upon the molding conditions, the evenness of the surface delustering of a molded product tends to be impaired, and the decrease in the impact strength is substantial. Further, the method (iii) has drawbacks such that the degree of delustering is inadequate, it is difficult to obtain a uniformly delustered surface, and the rigidity tends to decrease.

In the production of ABS resins, it is usual that ABS resins having a high gloss and good impact strength are obtainable by charging the total amount of polybutadiene before the initiation of the graft polymerization, followed by graft polymerization. On the other hand, for the purpose of obtaining delustered ABS resins, it has been proposed to graft-polymerize a part of polybutadiene within a range of conversion of from 40 to 70% by weight. However, this method has a difficulty that the graft structure can hardly be controlled with good reproducibility, and accordingly there is a difficulty in the reproducibility of delustering.

It is an object of the present invention to overcome these drawbacks. The present invention has been accomplished on the basis of the discovery that it is possible to obtain excellent delustering effects without deterioration of the above-mentioned various physical properties of ABS resins by adopting a two step polymerization process which produces a combination of two types of graft polymers i.e. by dividing the graft polymerization in two steps so that in the polymerization of the first step, graft polymerization is completed in the same manner as in the usual process for the preparation of ABS resins in order to obtain impact strength, and in the second step, a further rubber component and the remainder of monomers are added to conduct partial grafting to the rubber component, whereby the partially grafted copolymer obtained by the graft polymerization of the second step may lead to an agglomeration of rubber due to the heating at the time of extrusion or injection molding, but such agglomerated portion may suitably be dispersed by e.g. an extruder to obtain a resin having a substantially reduced gloss as compared with the conventional ABS resins.

Namely, the present invention provides a process for producing a low gloss thermoplastic resin which comprises polymerizing in two steps from 20 to 70 parts by weight, preferably from 30 to 60 parts by weight, of a butadiene polymer, at least 70% by weight of which is constituted by butadiene, with from 30 to 80 parts by weight, preferably from 40 to 70 parts by weight, of a total of from 15 to 40% by weight of a vinyl cyanide monomer and from 60 to 85% by weight of an aromatic vinyl monomer, characterized in that for the polymerization of the first step, the butadiene polymer, the vinyl cyanide monomer and the aromatic vinyl monomer were charged in amounts corresponding to from 20 to 80% by weight, preferably from 30 to 70% by weight, of the entire butadiene polymer, from 20 to 80% by weight, preferably from 30 to 70% by weight, of the entire vinyl cyanide monomer and from 20 to 80% by weight, preferably from 30 to 70% by weight, of the entire aromatic vinyl monomer, respectively, and after the completion of the polymerization of the first step, the rest of the butadiene polymer, the vinyl cyanide monomer and the aromatic vinyl monomer were charged for the polymerization of the second step.

Now, the present invention will be described in detail with reference to the preferred embodiments.

In this invention, in order to obtain physical properties practically useful as ABS resins, it is necessary to graft-polymerize the vinyl cyanide and aromatic vinyl monomers to the butadiene polymer. In this case, the amount of the butadiene polymer as the base material is preferably not more than 70 parts by weight. If the amount exceeds 70 parts by weight, the amount of grafting will be inadequate to provide the basic properties required for ABS resins, and agglomeration of the diene polymer will proceed, whereby a molded product tends to be inferior in the rigidity and in the surface properties, and the impact strength tends to deteriorate. On the other hand, if the amount is less than 20 parts by weight, it becomes difficult to form a graft structure required for delutering, whereby the degree of delustering in a molded product will be inadequate.

If the vinyl cyanide monomer used in the present invention exceeds 40% by weight, the flow properties of a resulting ABS resin for processing tend to deteriorate, and the coloring during heat molding tends to be substantial. On the other hand, if it is less than 15% by weight, the impact resistance, rigidity and chemical resistance tend to deteriorate, such being not practical, although the flow properties for the processing of the ABS resin may be improved.

The butadiene polymer to be used in the present invention is constituted by butadiene in at least 70% by weight thereof, and includes a polybutadiene, a butadiene-styrene copolymer, a butadiene-acrylonitrile copolymer and a polyisoproprene. Preferred are a polybutadiene, a butadiene-styrene copolymer and a butadiene-acrylonitrile copolymer. These polymers may be employed alone or in combination as a mixture.

In the operation of the present invention, it is possible to obtain a thermoplastic resin having a still lower gloss and better delustered state by using a butadiene polymer having an average particle size of at least 0.05 μm and a gel content of at most 60% by weight. The butadiene polymer having an average particle size of at least 0.05 μm and a gel content of at most 60% by weight may be used alone, or in combination with a butadiene polymer having a gel content of more than 60% by weight.

By using a butadiene polymer having such an average particle size and gel content, the surface gloss of the molded article of the resulting thermoplastic resin has little temperature dependency during the molding, and yet it is possible to obtain a molded product having a substantially reduced gloss as compared with conventional ABS resins. Here, the average particle size and the gel content are obtained by the following methods.

Average particle size:

With respect to a butadiene polymer latex, a calibration curve is prepared from the relation between the particle size obtained by an electron microscope observation and the absorbance measured at a wave length of 700 mμm with respect to a diluted solution (0.5 g/liter) of the latex. Then, the average particle size of a latex is determined by measuring the absorbance of the latex and applying the measured value to the calibration curve.

Gel content:

A butadiene polymer latex is added to isopropyl alcohol at room temperature, and the mixture is heated to 80° C. to let the polymer coagulate and solidify. Then, the solidified polymer is collected by filtration, washed and vacuum-dried. To 1.0 g ($W_0$) of the dried polymer, 100 cc of toluene is added, and the mixture is left to stand at a cool dark place for 48 hours. Then, the polymer is separated by filtration with a 100 mesh metal net. The dried weight ($W_1$) is measured, and the gel content is calculated by the following formula:

$$\text{Gel content (\%)} = W_1/W_0 \times 100$$

The vinyl cyanide monomer to be used in the present invention includes acrylonitrile, methacrylonitrile, ethacrylonitrile and fumaronitrile. These monomers may be used alone or in combination as a mixture. Among them, acrylonitrile is preferred.

The aromatic vinyl monomer to be used in the present invention includes styrene, α-methylstyrene, o-methylstyrene, 1,3-dimethylstyrene, p-methylstyrene, P-t-butylstyrene, halogenated styrene and p-ethylstyrene. These aromatic vinyl monomers may be used alone or in combination as a mixture. Among them, styrene and α-methylstyrene are preferred. It is particularly preferred to use α-methylstyrene for the graft polymerization in the first step, since the agglomeration of the butadiene polymer is then likely to take place uniformly, thus leading to satisfactory delustering.

In the present invention, if the amount of butadiene polymer charged in the first step is less than 20% by weight of the entire butadiene polymer, it will be difficult to obtain a graft ratio required to provide adequate impact strength, whereby the impact strength will be inferior, and the agglomeration of the butadiene polymer tends to proceed too much, thus leading to an inferior outer appearance when formed into a molded product. On the other hand, if the amount of the butadiene polymer charged in the first step exceeds 80% by weight of the entire butadiene polymer, the grafting to the butadiene polymer in the second step polymerization proceeds so much that the degree of the delustering will be inadequate.

The thermoplastic resin obtained by the present invention has a low gloss and high impact strength. This thermoplastic resin may be used in a blend with an acrylonitrile-styrene copolymer (AS resin), an acrylonitrile-α-methylstyrene copolymer or an acrylonitrile-α-methylstyrene-maleimide copolymer in the same manner as in the case of ordinary ABS resins. Further, it may be used in a blend with a polycarbonate resin, a polybutyrene terephthalate resin, a polymethyl methacrylate resin, an acryl rubber-modified acrylonitrile-styrene graft copolymer (AAS resin) or an ethylene-propylene rubber-modified acrylonitrile-styrene graft copolymer (AES resin). Furthermore, the thermoplastic resin obtained by the method of the present invention may be used by subjecting it to luster treatment such as plating, sputtering or hot stamping, as in the case of ordinary ABS resins. It may further be formed into a sheet by extrusion, followed by vacuum molding or compression molding to obtain a molded product having a delustered outer appearance.

In this invention, the graft polymerization in the first step is conducted in the same manner as in the production of ordinary ABS resins in order to provide impact strength and the rubber component and the remainder of the monomers are added in the second step to conduct the partial grafting to the rubber component. By adopting such a two step polymerization process of a combination of two types of graft polymerization, excellent delustering effects are obtainable without impairing various physical properties of the ABS resins.

Now, the present invention will be described in detail with reference to Examples. However, it should be understood that the present invention is by no means restricted by these specific Examples.

In the following Examples and Comparative Examples, "parts" means "parts by weight". The evaluation of the physical properties were conducted in accordance with the following methods.

(1) Monomer conversion:

The emulsion graft polymer latex was added to isopropyl alcohol at room temperature, and the mixture was heated to 80° C. to let the polymer coagulate and solidify The solidified polymer was collected by filtration, washed and dried. The solid content of the graft polymer latex was calculated by the following equation.

$$\text{Monomer Conversion} = \frac{\text{Total amount of graft polymer* } - \text{Amount of diene polymer}}{\text{Total charge of monomers}} \times 100(\%)$$

*Total amount of graft polymer = Total charge × graft polymer latex concentration (2) Graft ratio:

The emulsion graft polymer latex was added to isopropyl alcohol at room temperature, and the mixture was heated to 80° C. to let the polymer coagulate and solidify. The solidified polymer was collected by filtration, washed and dried to obtain a graft polymer. A predetermined amount (a) of the polymer powder was introduced in acetone and heated at 70° C. for 3 hours to completely dissolve a free resinous copolymer. Then, the insoluble content (b) was separated by a centrifugal separator from this solution. Then, the graft ratio was calculated by the following equation.

Graft ratio =

$$\frac{b - a \times \text{rubber content in the graft polymer}}{a \times \text{rubber content in the graft polymer}} \times 100(\%)$$

(3) Reduced viscosity ($\eta$sp/c):
The reduced viscosities ($\eta$sp/c) of the free vinyl cyanide-aromatic vinyl copolymer in the graft polymer and the vinyl cyanide-aromatic vinyl copolymer separately added, were measured in the respective 0.2% dimethylformamide solutions at 25° C. by Ubbellohde viscometer.

(4) Izod impact strength (IZOD):
Notched test piece having a thickness of 1/4 inch, ASTM-D-256 (kg.cm/cm)

(5) Melt flow index (MI):
200° C., load: 5 kg, ASTM-D-1238 (g/10 min)

(6) Rockwell hardness (R):
ASTM-D-785 (R scale)

(7) Vicat softening temperature (VST):
ISO-306 (°C.)

(8) Gloss (GLOSS):
ASTM-D-523-62T

In Tables 1 and 2, 200° C., 250° C. and 270° C. indicate the cylinder temperatures of the injection molding machine.

Molding conditions: 1 ounce injection molding machine
Mold temperature: 60° C.
Injection pressure: Short shot pressure +5 kg/cm²

Molded sheet: 80 mm in length, 50 mm in width, 3 mm in thickness (9) Yellow index (YI):
JIS K-7103

(10) Outer appearance i.e. uniformity of the delustering of the surface (as evaluated by visual assessment):
◉ : Highly uniform
○ : Uniform
X : Poor uniformity
: Bad uniformity Molding conditions: 1 ounce injection molding machine
Mold temperature: 60° C.
Injection pressure: Short shot pressure +5 kg/cm²

Molded sheet: 80 mm in length, 50 mm in width, 3 mm in thickness

EXAMPLE 1

20 parts (as solid content) of polybutadiene latex (average particle size: 0.3 μm, gel content: 80% by weight, solid content: 50%), 200 parts of distilled water, 2.0 parts of potassium rosinate, 0.2 part of a naphthalene sulfonic acid-formalin condensation product (DEMOL N, trademark, manufactured by Kao Soap, emulsifying agent), 0.02 part of sodium hydroxide, 0.35 part of dextrose, 9 parts of acrylonitrile and 21 parts of styrene were charged into a reactor, and 0.15 part of cumene hydroperoxide and 0.3 part of tertiary dodecylmercaptan were introduced under stirring. The mixture was heated to 70° C., and then an aqueous solution of a mixture of 0.01 part of ferrous sulfate and 0.2 part of sodium pyrophosphate, was charged to initiate the polymerization. The physical properties of the latex obtained in the first step are shown in Table 1.

To this latex, 20 parts of polybutadiene latex (same as above), 9 parts of acrylonitrile, 21 parts of styrene and 0.5 part of tertiary dodecylmercaptan were charged at 70° C. The mixture was heated to 75° C., and then 0.2 part of cumene hydroperoxide was introduced to complete the polymerization. After the completion of the polymerization, 0.2 part (relative to the polymer) of 2,6-di-tert-butyl-4-methylphenol was added to the latex, and then the latex was coagulated by sulfuric acid, followed by filtration and dried. To 40 parts of the resinous solid thus obtained, 60 parts of an acrylonitrile-styrene copolymer resin (acrylonitrile content: 25% by weight, $\eta$sp/c: 0.6) was blended, and the mixture was melt-kneaded by a 40 mm single screw extruder, then pelletized and molded by a 1 ounce injection molding machine to obtain a test piece. The physical properties of the test piece were measured and shown in Table 1.

EXAMPLE 2

30 parts (as solid content) of polybutadiene latex (average particle size: 0.3 μm, gel content: 80% by weight, solid content: 50%), 200 parts of distilled water, 2.0 parts of potassium rosinate, 0.2 part of DEMOL N (manufactured by Kao Soap), 0.02 part of sodium hydroxide, 0.35 part of dextrose, 9 parts of acrylonitrile and 21 parts of styrene were charged into a reactor, and 0.15 part of cumene hydroperoxide and 0.3 part of tertiary dodecylmercaptan were introduced under stirring. The mixture was heated to 70° C., and then an aqueous solution of a mixture of 0.01 part of ferrous sulfate and 0.2 part of sodium pyrophosphate, was charged to initiate the polymerization. The physical properties of the latex obtained in the first step are shown in Table 1.

To this latex, 10 parts of polybutadiene latex (same as above), 9 parts of acrylonitrile, 21 parts of styrene and 0.5 part of tertiary dodecylmercaptan were charged at 70° C. The mixture was heated to 75° C., and then 0.2 part of cumene hydroperoxide was introduced to complete the polymerization. After the completion of the polymerization, 0.2 part (relative to the polymer) of 2,6-di-tert-butyl-4-methylphenol was added to the latex, and then the latex was coagulated by sulfuric acid, followed by filtration and drying. To 40 parts of the resinous solid thus obtained, 60 parts of an acrylonitrile-styrene copolymer resin (acrylonitrile content: 25% by weight, $\eta$sp/c: 0.6) was melt-kneaded, then pelletized and injection-molded in the same manner. The physical properties of the molded product were measured and shown in Table 1.

EXAMPLE 3

10 parts (as solid content) of polybutadiene latex (average particle size: 0.3 μm, gel content: 80% by weight, solid content: 50%), 200 parts of distilled water, 2.0 parts of potassium rosinate, 0.2 part of DEMOL N (manufactured by Kao Soap), 0.02 part of sodium hydroxide, 0.35 part of dextrose, 9 parts of acrylonitrile and 21 parts of styrene were charged into a reactor, and 0.15 part of cumene hydroperoxide and 0.3 part of tertiary dodecylmercaptan were added under stirring. The mixture was heated to 70° C., and then an aqueous solution of a mixture of 0.01 part of ferrous sulfate and 0.2 part of sodium pyrophosphate was charged to initiate the polymerization. The physical properties of the latex obtained in the first step are shown in Table 1.

To this latex, 30 parts of polybutadiene latex (same as above), 9 parts of acrylonitrile, 21 parts of styrene and 0.5 part of tertiary dodecylmercaptan were charged at 70° C. The mixture was heated to 75° C., and then 0.2 part of cumene hydroperoxide was introduced to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 40 parts of the resinous solid thus obtained, 60 parts of an acrylonitrile-styrene copolymer resin (acrylonitrile content: 25% by weight, $\eta sp/c$: 0.6) was melt-kneaded, then pelletized and injection-molded. The physical properties of the injection-molded product were measured and shown in Table 1.

EXAMPLE 4

20 parts (as solid content) of polybutadiene latex (average particle size: 0.3 μm, gel content: 80% by weight, solid content: 50%), 150 parts of distilled water, 2.0 parts of potassium rosinate, 0.2 part of DEMOL N (manufactured by Kao Soap), 0.02 part of sodium hydroxide, 0.35 part of dextrose, and aqueous solution of a mixture of 0.01 part of ferrous sulfate and 0.2 part of sodium pyrophosphate, were charged into a reactor, and the mixture was heated to 70° C. under stirring. When the temperature reached 60° C., a solution of a mixture comprising 6 parts of acrylonitrile, 14 parts of styrene, 0.15 part of cumene hydroperoxide and 0.27 part of tertiary dodecylmercaptan, was dropwise added to initiate the polymerization. The time required for the dropwise addition of the solution of the mixture was 70 minutes. The physical properties of the latex obtained in the first step are shown in Table 1.

To this latex, 40 parts of polybutadiene latex (same as above) was charged at 70° C. The mixture was heated to 75° C., and then a solution of a mixture comprising 6 parts of acrylonitrile, 14 parts of styrene, 0.15 part of cumene hydroperoxide and 0.27 part of tertiary dodecylmercaptan, was dropwise added to initiate the polymerization. The time for the dropwise addition of the solution of the mixture was 70 minutes. After the completion of the dropwise addition of the solution of the mixture, 0.15 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 25 parts of the resinous solid thus obtained, 75 parts of an acrylonitrile-styrene copolymer resin (acrylonitrile content: 25% by weight, $\eta sp/c$: 0.6) was melt-kneaded, then pelletized and injection-molded. The physical properties of the injection-molded product were measured and shown in Table 1.

EXAMPLE 5

30 parts (as solid content) of polybutadiene latex (average particle size: 0.3 μm, gel content: 80% by weight, solid content: 50%), 150 parts of distilled water, 2.0 parts of potassium rosinate, 0.2 part of DEMOL N (manufactured by Kao Soap), 0.02 part of sodium hydroxide, 0.35 part of dextrose and an aqueous solution of a mixture comprising 0.01 part of ferrous sulfate and 0.2 part of sodium pyrophosphate, were charged into a reactor, and the mixture was heated to 70° C. under stirring. Then, a solution of a mixture comprising 6 parts of acrylonitrile, 14 parts of styrene, 0.15 part of cumene hydroperoxide and 0.27 part of tertiary dodecylmercaptan, was dropwise added to initiate the polymerization. The time for the dropwise addition of the solution of the mixture was 70 minutes. The physical properties of the latex obtained in the first step are shown in Table 1.

To this latex, 30 parts of polybutadiene latex (same as above) was charged at 70° C. The mixture was heated to 75° C., and then a solution of a mixture comprising 6 parts of acrylonitrile, 14 parts of styrene, 0.15 part of cumene hydroperoxide and 0.27 part of tertiary dodecylmercaptan, was dropwise added to initiate the polymerization. The time for the dropwise addition of the solution of the mixture was 70 minutes. After the completion of the dropwise addition of the solution of the mixture, 0.15 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 25 parts of the resinous solid thus obtained, 75 parts of an acrylonitrile-styrene copolymer resin (acrylonitrile content: 25% by weight, $\eta sp/c$: 0.6) was melt-kneaded, then pelletized and injection-molded. The physical properties of the injection-molded product were measured. The results are shown in Table 1.

EXAMPLE 6

40 parts (as solid content) of polybutadiene latex (average particle size: 0.3 μm, gel content: 80% by weight, solid content: 50%), 150 parts of distilled water, 2.0 parts of potassium rosinate, 0.2 part of DEMOL N (manufactured by Kao Soap), 0.02 part of sodium hydroxide, 0.35 part of dextrose and an aqueous solution of a mixture comprising 0.01 part of ferrous sulfate and 0.2 part of sodium pyrophosphate, were charged into a reactor. The mixture was heated to 70° C., and then a solution of a mixture comprising 6 parts of acrylonitrile, 14 parts of styrene, 0.15 part of cumene hydroperoxide and 0.27 part of tertiary dodecylmercaptan, was dropwise added to initiate the polymerization. The time for the dropwise addition of the solution of the mixture was 70 minutes. The physical properties of the latex obtained in the first step are shown in Table 1.

To this latex, 20 parts of polybutadiene latex (same as above) was charged at 70° C. The mixture was heated to 75° C., and then a solution of a mixture comprising 6 parts of acrylonitrile, 14 parts of styrene, 0.15 part of cumene hydroperoxide and 0.27 part of tertiary dodecylmercaptan, was dropwise added to initiate the polymerization. The time for the dropwise addition of the solution of the mixture was 70 minutes. After the completion of the dropwise addition of the solution of the mixture, 0.15 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 25 parts of the resinous solid thus obtained, 75 parts of an acrylonitrile-styrene copolymer resin (acrylonitrile content: 25% by weight, $\eta sp/c$: 0.6) was melt-kneaded, then pelletized and injection-molded. The physical properties of the injection-molded product were measured. The results are shown in Table 1.

EXAMPLE 7

To 25 parts of the resinous solid obtained in Example 5, 75 parts of an acrylonitrile-α-methylstyrene copolymer resin (α-methylstyrene content: 80% by weight, ηsp/c: 0.5) was melt-kneaded, then pelletized and injection-molded. The physical properties of the injection-molded product were measured. The results are shown in Table 1.

EXAMPLE 8

To 35 parts of the resinous solid obtained in Example 5, 65 parts of an acrylonitrile-α-methylstyrene copolymer resin (α-methylstyrene content: 80% by weight, ηsp/c: 0.5) was melt-kneaded, then pelletized and injection-molded. The physical properties of the injection-molded product were measured. The results are shown in Table 1.

EXAMPLE 9

To 40 parts of the resinous solid obtained in Example 1, 60 parts of an acrylonitrile-α-methylstyrene copolymer resin (α-methylstyrene content: 80% by weight, ηsp/c: 0.5) was melt-kneaded, then pelletized and injection-molded. The physical properties of the injection-molded product were measured. The results are shown in Table 1.

COMPARATIVE EXAMPLE 1

50 parts (as solid content) of polybutadiene latex (average particle size: 0.3 μm, gel content: 80% by weight, solid content: 50%), 150 parts of distilled water, 1.0 parts of potassium rosinate, 0.2 part of DEMOL N (manufactured by Kao Soap), 0.02 part (as solid content) of an aqueous sodium hydroxide solution, 0.35 part of dextrose and an aqueous solution of a mixture comprising 0.01 part of ferrous sulfate and 0.2 part of sodium pyrophosphate, were charged into a reactor. The mixture was heated to 70° C. under stirring, and then a solution of monomer mixture comprising 15 parts of acrylonitrile, 35 parts of styrene, 0.3 part of cumene hydroperoxide and 0.6 part of tertiary dodecylmercaptan, was dropwise added over a period of 120 minutes to complete the polymerization. To the latex after cooling, 0.2 part (relative to the polymer) of 2,6-di-tert-butyl-4-methylphenol was added to obtain a graft polymer latex. This latex was coagulated by sulfuric acid, washed, filtered and dried to obtain a graft polymer. To 30 parts of the resinous solid thus obtained, 70 parts of an acrylonitrile-styrene copolymer (acrylonitrile content: 25% by weight, ηsp/c: 0.6) was melt-kneaded, then pelletized and injection-molded. The physical properties of the injection-molded product were measured. The results are shown in Table 2.

COMPARATIVE EXAMPLE 2

To 100 parts of an acrylonitrile-butadiene-styrene copolymer resin (Diapet ®ABS 3001M, manufactured by Mitsubishi Rayon Co., Ltd., Standard ABS resin for plating), 10 parts of a butadiene-acrylonitrile copolymer (acrylonitrile content: 20%, hereinafter referred to simply as NBR) was mixed by a Henschel mixer. Then, the mixture was melt-kneaded by a twin screw extruder with a vent, then pelletized and injection-molded. The physical properties of the injection-molded product were measured. The results are shown in Table 2.

COMPARATIVE EXAMPLE 3

45 parts (as solid content) of polybutadiene latex (average particle size: 0.3 μm, gel content: 80% by weight, solid content: 50%), 200 parts of distilled water, 2.0 parts of potassium rosinate, 0.2 part of DEMOL N (manufactured by Kao Soap), 0.02 part of sodium hydroxide, 0.35 part of dextrose, 7 parts of acrylonitrile and 18 parts of styrene were introduced into the reactor, and 0.15 part of cumene hydroperoxide and 0.3 part of tertiary dodecylmercaptan, were introduced under stirring. The mixture was heated to 70° C., and then an aqueous solution of a mixture comprising 0.01 part of ferrous sulfate and 0.2 part of sodium pyrophosphate, was charged to initiate the polymerization. To this latex, 5 parts of polybutadiene latex (same as above), 7 parts of acrylonitrile, 18 parts of styrene and 0.5 part of tertiary dodecylmercaptan were charged. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 35 parts of the resinous solid thus obtained, 65 parts of an acrylonitrile-styrene copolymer resin (acrylonitrile content: 25% by weight, ηsp/c: 0.6) was melt-kneaded, then pelletized and injection-molded. The physical properties of the injection-molded product were measured. The results are shown in Table 2.

COMPARATIVE EXAMPLE 4

To the latex obtained in Comparative Example 1, 15 parts (as solid content) of a butadiene-styrene copolymer (styrene content: 20% by weight) latex was blended, and coagulated by sulfuric acid, followed by washing, filtration and drying. To 30 parts of the resinous solid thus obtained, 70 parts of an acrylonitrile-styrene copolymer resin (acrylonitrile content: 25% by weight, ηsp/c: 0.6) was blended and melt-kneaded by a Henschel mixer, then pelletized and injection-molded. The physical properties of the injection-molded product were measured. The results are shown in Table 2.

COMPARATIVE EXAMPLE 5

To 30 parts of the graft polymer obtained in Comparative Example 1, 30 parts of a commercially available delustering agent (KF-710, manufactured by Rhom & Haas Co.) and 70 parts of an acrylonitrile-styrene copolymer resin (acrylonitrile content: 25% by weight, ηsp/c: 0.6) were blended and melt-kneaded by a Henschel mixer, then pelletized and injection-molded. The physical properties of the injection-molded product were measured. The results are shown in Table 2.

EXAMPLE 10

30 parts (as solid content) of polybutadiene latex (average particle size: 0.3 μm, gel content: 40% by weight, solid content: 55% by weight), 150 parts of distilled water, 2 parts of potassium rosinate, 0.2 part of DEMOL N (manufactured by Kao Soap), 0.02 part of sodium hydroxide, 0.35 part of dextrose, 6 parts of acrylonitrile and 14 parts of styrene were charged into a reactor, and 0.2 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 30 parts of polybutadiene latex (same as above), 6 parts of acrylonitrile, 14 parts of styrene and 0.3 part of tertiary dodecylmercaptan, were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 25 parts of the resinous solid thus obtained, 75 parts of an acrylonitrile-styrene copolymer resin (acrylonitrile content: 25% by weight, $\eta$sp/c: 0.6) was blended, and melt-kneaded by a 40 mm single screw extruder, then pelletized and injection-molded by a 1 ounce injection-molding machine. The physical properties of the test piece thus prepared were measured. The results are shown in Table 1.

EXAMPLE 11

To 25 parts of the resinous solid obtained in Example 10, 75 parts of an acrylonitrile-α-methylstyrene copolymer resin (α-methylstyrene content: 80% by weight, $\eta$sp/c: 0.5) was melt-kneaded, then pelletized and molded by a 1 ounce injection-molding machine. The physical properties of the test piece thus molded, were measured. The results are shown in Table 1.

EXAMPLE 12

22.5 parts (as solid content) of polybutadiene latex average particle size: 0.3 μm, gel content: 40% by weight, solid content: 55% by weight), 150 parts of distilled water, 1 part of potassium rosinate, 0.2 part of DEMOL N (manufactured by Kao Soap), 0.02 part of sodium hydroxide, 0.35 part of dextrose, 8 parts of acrylonitrile and 20 parts of styrene were charged into a reactor, and 0.1 part of cumene hydroperoxide and 0.2 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 22.5 parts of polybutadiene latex (same as above), 8 parts of acrylonitrile, 19 parts of styrene and 0.3 part of tertiary dodecylmercaptan, were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 35 parts of the resinous solid thus obtained, 65 parts of an acrylonitrile-styrene copolymer resin (acrylonitrile content: 25% by weight, $\eta$sp/c: 0.6) was blended, and melt-kneaded by a 40 mm single screw extruder, then pelletized and molded by a 1 ounce injection-molding machine. The physical properties of the test piece thus molded were measured. The results are shown in Table 1.

EXAMPLE 13

42 parts (as solid content) of polybutadiene latex (average particle size: 0.3 μm, gel content: 50% by weight, solid content: 50% by weight), 150 parts of distilled water, 2 parts of potassium rosinate, 0.2 part of DEMOL N (manufactured by Kao Soap), 0.02 part of sodium hydroxide, 0.35 part of dextrose, 6 parts of acrylonitrile and 14 parts of styrene were charged into a reactor, and 0.2 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 18 parts of polybutadiene latex (same as above), 6 parts of acrylonitrile, 14 parts of styrene and 0.3 part of tertiary dodecylmercaptan, were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 25 parts of the resinous solid thus obtained, 75 parts of an acrylonitrile-styrene copolymer resin (acrylonitrile content: 25% by weight, $\eta$sp/c: 0.6) was blended, and melt-kneaded by a 40 mm single screw extruder, then pelletized and molded by a 1 ounce injection-molding machine. The physical properties of the test piece thus molded were measured. The results are shown in Table 1.

EXAMPLE 14

To 25 parts of the resinous solid obtained in Example 13, 75 parts of an acrylonitrile-α-methylstyrene copolymer resin (α-methylstyrene content: 80% by weight, $\eta$sp/c: 0.5) was melt-kneaded, then pelletized and molded by 1 ounce injection molding machine. The physical properties of the test piece thus molded were measured. The results are shown in Table 1.

EXAMPLE 15

36 parts (as solid content) of polybutadiene latex (average particle size: 0.3 μm, gel free, solid content: 50% by weight), 150 parts of distilled water, 1 part of potassium rosinate, 0.2 part of DEMOL N (manufactured by Kao Soap), 0.02 part of sodium hydroxide, 0.35 part of dextrose, 6 parts of acrylonitrile and 14 parts of styrene were charged into a reactor, and 0.2 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 24 parts of polybutadiene latex (same as above), 6 parts of acrylonitrile, 14 parts of styrene and 0.3 part of tertiary dodecylmercaptan, were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 30 parts of the resinous solid thus obtained, 70 parts of an acrylonitrile-styrene copolymer resin (acrylonitrile content: 25% by weight, $\eta$sp/c: 0.6) was blended, and melt-kneaded by a 40 mm single screw extruder, then pelletized and molded by a 1 ounce injection-molding machine. The physical properties of the test piece thus molded were measured. The results are shown in Table 1.

EXAMPLE 16

To 40 parts of the resinous solid obtained in Example 15, 70 parts of a polycarbonate resin (polycarbonate 7022PJ, tradename, manufactured by Mitsubishi Chemical Industries, Ltd.) was melt-kneaded, then pelletized and molded by a 1 ounce injection-molding machine. The physical properties of the test piece thus molded were measured. The results are shown in Table 1.

EXAMPLE 17

30 parts (as solid content) of polybutadiene latex (average particle size: 0.3 $\mu$m, gel content: 40% by weight, solid content: 55% by weight), 150 parts of distilled water, 2 parts of potassium rosinate, 0.2 part of DEMOL N (manufactured by Kao Soap), 0.02 part of sodium hydroxide, 0.35 part of dextrose, 0.6 part of acrylonitrile and 14 parts of $\alpha$-methylstyrene were charged into a reactor, and 0.3 part of cumene hydroperoxide and 0.1 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 30 parts of polybutadiene latex (same as above), 6 parts of acrylonitrile, 14 parts of styrene and 0.2 part of tertiary dodecylmercaptan, were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 30 parts of the resinous solid thus obtained, 70 parts of an acrylonitrile-styrene copolymer resin (acrylonitrile content: 25% by weight, $\eta$sp/c: 0.6) was blended, and melt-kneaded by a 40 mm single screw extruder, then pelletized and molded by a 1 ounce injection-molding machine. The physical properties of the test piece thus molded were measured. The results are shown in Table 1.

EXAMPLE 18

To 30 parts of the resinous solid obtained in Example 17, 70 parts of an acrylonitrile-$\alpha$-methylstyrene copolymer resin ($\alpha$-methylstyrene content: 80% by weight, $\eta$sp/c: 0.5) was melt-kneaded, then pelletized and molded by a 1 ounce injection-molding machine. The physical properties of the test piece thus molded were measured. The results are shown in Table 1.

EXAMPLE 19

20 parts (as solid content) of polybutadiene latex (average particle size: 0.3 $\mu$m, gel content: 40% by weight, solid content: 55% by weight), 150 parts of distilled water, 2 parts of potassium rosinate, 0.2 part of DEMOL N (manufactured by Kao Soap), 0.02 part of sodium hydroxide, 0.35 part of dextrose, 6 parts of acrylonitrile and 14 parts of styrene were charged into a reactor, and 0.2 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 30 parts of polybutadiene latex (same as above), 6 parts of acrylonitrile, 14 parts of styrene and 0.6 part of tertiary dodecylmercaptan, were charged at 70° C. The mixture was heated to 75° C., and then 0.3 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 40 parts of the resinous solid thus obtained, 60 parts of an acrylonitrile-styrene copolymer resin (acrylonitrile content: 25% by weight, $\eta$sp/c: 0.6) was blended, and molded by a 1 ounce injection-molding machine. The physical properties of the test piece thus molded were measured. The results are shown in Table 1.

EXAMPLE 20

To 40 parts of the resinous solid obtained in Example 19, 60 parts of an acrylonitrile-$\alpha$-methylstyrene copolymer resin ($\alpha$-methylstyrene content: 80% by weight, $\eta$sp/c: 0.5) was melt-kneaded, then pelletized and molded by a 1 ounce injection-molding machine. The physical properties of the test piece thus molded were measured. The results are shown in Table 1.

EXAMPLE 21

20 parts (as solid content) of polybutadiene latex (average particle size: 0.3 $\mu$m, gel content: 80% by weight, solid content: 50% by weight), 200 parts of distilled water, 2.0 parts of potassium rosinate, 0.2 part of DEMOL N (manufactured by Kao Soap), 0.02 part of sodium hydroxide, 0.35 part of dextrose, 9 parts of acrylonitrile and 21 parts of $\alpha$-methylstyrene were charged into a reactor, and 0.15 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 1.

To this latex, 20 parts of polybutadiene latex (same as above), 9 parts of acrylonitrile, 21 parts of styrene and 0.5 part of tertiary dodecylmercaptan, were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 40 parts of the resinous solid thus obtained, 40 parts of an acrylonitrile-styrene copolymer resin (acrylonitrile content: 25% by weight, $\eta$sp/c: 0.6) was blended, melt-kneaded by a 40 mm single screw extruder, then pelletized and molded by a 1 ounce injection-molding machine. The physical properties of the test piece thus molded were measured. The results are shown in Table 1.

COMPARATIVE EXAMPLE 6

45 parts (as solid content) of polybutadiene latex (average particle size: 0.3 $\mu$m, gel content: 40% by weight, solid content: 55% by weight), 150 parts of distilled water, 1 part of potassium rosinate, 0.2 part of DEMOL N (manufactured by Kao Soap), 0.02 part of sodium hydroxide, 0.35 part of dextrose, 8 parts of acrylonitrile and 20 parts of styrene were charged into a reactor, and 0.2 part of cumene hydroperoxide and 0.2 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 2.

To this latex, 8 parts of acrylonitrile, 19 parts of styrene and 0.4 part of tertiary dodecylmercaptan, were charged at 70° C. The mixture was heated to 75° C., and then 0.3 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 35 parts of the resinous solid thus obtained, 65 parts of an acrylonitrile-styrene copolymer resin (acrylonitrile content: 25% by weight, $\eta sp/c$: 0.6) was blended, melt-kneaded by a 40 mm single screw extruder, then pelletized and molded by a 1 ounce injection-molding machine. The physical properties of the test piece thus molded were measured. The results are shown in Table 2.

COMPARATIVE EXAMPLE 7

5 parts (as solid content) of polybutadiene latex (average particle size: 0.3 μm, gel content: 40% by weight, solid content: 55% by weight), 150 parts of distilled water, 2 parts of potassium rosinate, 0.2 part of DEMOL N (manufactured by Kao Soap), 0.02 part of sodium hydroxide, 0.35 part of dextrose, 8 parts of acrylonitrile and 20 parts of styrene were charged into a reactor, and 0.2 part of cumene hydroperoxide and 0.2 part of tertiary dodecylmercaptan were added under stirring The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 2.

To this latex, 40 parts of polybutadiene latex (same as above), 8 parts of acrylonitrile, 19 parts of styrene and 0.4 part of tertiary dodecylmercaptan, were charged at 70° C. The mixture was heated to 75° C., and then 0.3 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 35 parts of the resinous solid thus obtained, 65 parts of an acrylonitrile-styrene copolymer resin (acrylonitrile content: 25% by weight, $\eta sp/c$: 0.6) was blended, then melt-kneaded by a 40 mm single screw extruder, then pelletized and molded by a 1 ounce injection-molding machine. The physical properties of the test piece thus molded were measured. The results are shown in Table 2.

COMPARATIVE EXAMPLE 8

To 35 parts of the resinous solid obtained in Comparative Example 7, 65 parts of an acrylonitrile-α-methylstyrene copolymer resin (α-methylstyrene content: 80% by weight, $\eta sp/c$: 0.5) was melt-kneaded, then pelletized and molded by a 1 ounce injection-molding machine. The physical properties of the test piece thus molded were measured. The results are shown in Table 2.

COMPARATIVE EXAMPLE 9

50 parts (as solid content) of polybutadiene latex (average particle size: 0.3 μm, gel content: 85% by weight, solid content: 50% by weight), 150 parts of distilled water, 2 parts of potassium rosinate, 0.2 part of DEMOL N (manufactured by Kao Soap), 0.02 part of sodium hydroxide, 0.35 part of dextrose and an aqueous solution of a mixture comprising 0.01 part of ferrous sulfate and 0.2 part of sodium pyrophosphate, were charged to a reactor, and heated to 75° C. under stirring. Then, a solution of a mixture comprising 15 parts of acrylonitrile, 35 parts of α-methylstyrene, 0.2 part of cumene hydroperoxide and 0.5 part of tertiary dodecylmercaptan, was dropwise added over a period of 100 minutes to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 35 parts of the resinous solid thus obtained, 65 parts of an acrylonitrile-styrene copolymer resin (acrylonitrile content: 25% by weight, $\eta sp/c$: 0.6) was blended, then melt-kneaded by a 40 mm single screw extruder, then pelletized and molded by a 1 ounce injection-molding machine. The physical properties of the test piece thus molded were measured. The results are shown in Table 2.

COMPARATIVE EXAMPLE 10

To 35 parts of the resinous solid obtained in Comparative Example 9, 65 parts of an acrylonitrile-α-methylstyrene copolymer resin (α-methylstyrene content: 80% by weight, $\eta sp/c$: 0.5) was melt-kneaded, then pelletized and molded by a 1 ounce injection-molding machine. The physical properties of the test piece thus molded were measured. The results are shown in Table 2.

COMPARATIVE EXAMPLE 11

50 parts (as solid content) of a styrene-butadiene copolymer (styrene content: 20% by weight) latex (average particle size: 0.3 μm, gel free, solid content: 65% by weight), 150 parts of distilled water, 1 part of potassium rosinate, 0.2 part of DEMOL N (manufactured by Kao Soap), 0.02 part of sodium hydroxide, 0.35 part of dextrose, 7 parts of acrylonitrile and 18 parts of styrene were charged into a reactor, and 0.2 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 2.

To this latex, 7 parts of acrylonitrile, 18 parts of styrene and 0.3 part of tertiary dodecylmercaptan were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 35 parts of the resinous solid thus obtained, 65 parts of an acrylonitrilestyrene copolymer resin (acrylonitrile content: 25% by weight, ηsp/c: 0 6) was blended, then melt-kneaded by a 40 mm single screw extruder, then pelletized and molded by a 1 ounce injection-molding machine. The physical properties of the test piece thus molded were measured. The results are shown in Table 2.

COMPARATIVE EXAMPLE 12

To 35 parts of the resinous solid obtained in Comparative Example 11, 65 parts of an acrylonitrile-α-methylstyrene copolymer resin (α-methylstyrene content: 80% by weight, ηsp/c: 0.5) was melt-kneaded, then pelletized and molded by a 1 ounce injection-molding machine. The physical properties of the test piece thus molded were measured. The results are shown in Table 2.

COMPARATIVE EXAMPLE 13

60 parts (as solid content) of polybutadiene latex average particle size: 0.3 μm, gel free, solid content: 50% by weight), 150 parts of distilled water, 20 parts of potassium rosinate, 0.2 part of DEMOL N (manufactured by Kao Soap), 0.02 part of sodium hydroxide, 0.35 part of dextrose, 6 parts of acrylonitrile and 14 parts of styrene were charged into a reactor, and 0.2 part of cumene hydroperoxide and 0.3 part of tertiary dodecylmercaptan were added under stirring. The mixture was heated to 70° C., and then an aqueous solution of a mixture comprising 0.01 part of ferrous sulfate and 0.2 part of sodium pyrophosphate, was charged to initiate the polymerization. The physical properties of the latex obtained in the first step are shown in Table 2.

To this latex, 6 parts of acrylonitrile, 14 parts of styrene and 0.3 part of tertiary dodecylmercaptan were charged at 70° C. The mixture was heated to 75° C., and then 0.2 part of cumene hydroperoxide was added to complete the polymerization. After the completion of the polymerization, 0.2 part (relative to the polymer) of 2,6-di-tert-butyl-4-methylphenol was added to the latex, and the latex was coagulated by sulfuric acid, followed by filtration and drying. To 40 parts of the resinous solid thus obtained, 60 parts of an acrylonitrilestyrene copolymer resin (acrylonitrile content: 25% by weight, ηsp/c: 0.6) was blended, then melt-kneaded by a 40 mm single screw extruder, then pelletized and molded by a 1 ounce injection-molding machine. The physical properties of the test piece thus molded were measured. The results are shown in Table 2.

COMPARATIVE EXAMPLE 14

To 40 parts of the resinous solid obtained in Comparative Example 13, 60 parts of an acrylonitrile-α-methylstyrene copolymer resin (α-methylstyrene content: 80% by weight, ηsp/c: 0.5) was melt-kneaded, then pelletized and molded by a 1 ounce injection-molding machine. The physical properties of the test piece thus molded were measured. The results are shown in Table 2.

TABLE 1

| | Monomer conversion | | Graft ratio | | ηsp/c | | | | | | GLOSS | | | Y.I. | Outer |
| | First step | After completion of polymerization | First step | After completion of polymerization | First step | After completion of polymerization | IZOD | M.I. | R | V.S.T. | 200° C. | 250° C. | 270° C. | 200° C. | appearance |
|---|---|---|---|---|---|---|---|---|---|---|---|---|---|---|---|
| Example 1 | 91 | 93 | 27 | 29 | 0.42 | 0.47 | 22 | 1.5 | 104 | 101 | 23 | 20 | 20 | 26 | ◎ |
| Example 2 | 91 | 92 | 22 | 31 | 0.42 | 0.48 | 26 | 1.8 | 105 | 101 | 33 | 28 | 27 | 26 | ◎ |
| Example 3 | 90 | 93 | 22 | 29 | 0.43 | 0.48 | 16 | 1.4 | 104 | 101 | 20 | 16 | 15 | 27 | ◎ |
| Example 4 | 94 | 93 | 27 | 27 | 0.30 | 0.30 | 20 | 2.0 | 107 | 102 | 21 | 20 | 20 | 23 | ○ |
| Example 5 | 94 | 94 | 27 | 28 | 0.31 | 0.32 | 19 | 2.2 | 109 | 103 | 26 | 24 | 22 | 24 | ◎ |
| Example 6 | 93 | 94 | 23 | 26 | 0.32 | 0.30 | 23 | 2.3 | 109 | 102 | 27 | 23 | 20 | 24 | ◎ |
| Example 7 | 94 | 94 | 27 | 28 | 0.31 | 0.32 | 8 | 0.2 | 107 | 125 | 29 | 26 | 24 | 78 | ◎ |
| Example 8 | 94 | 94 | 27 | 28 | 0.31 | 0.32 | 12 | 0.6 | 101 | 115 | 21 | 16 | 13 | 72 | ◎ |
| Example 9 | 91 | 93 | 27 | 29 | 0.42 | 0.47 | 9 | 0.7 | 105 | 110 | 23 | 19 | 18 | 69 | ◎ |
| Example 10 | 93 | 95 | 24 | 23 | 0.55 | 0.53 | 24 | 2.0 | 108 | 102 | 14 | 13 | 15 | 23 | ◎ |
| Example 11 | 93 | 95 | 24 | 23 | 0.55 | 0.53 | 12 | 0.2 | 108 | 121 | 16 | 17 | 16 | 68 | ◎ |
| Example 12 | 83 | 93 | 27 | 29 | 0.48 | 0.45 | 27 | 1.6 | 101 | 100 | 16 | 15 | 17 | 24 | ◎ |
| Example 13 | 94 | 95 | 22 | 23 | 0.52 | 0.50 | 23 | 1.5 | 107 | 102 | 20 | 18 | 16 | 22 | ◎ |
| Example 14 | 94 | 95 | 22 | 23 | 0.52 | 0.50 | 10 | 0.2 | 107 | 122 | 16 | 17 | 17 | 66 | ◎ |
| Example 15 | 91 | 95 | 20 | 24 | 0.45 | 0.37 | 18 | 1.5 | 105 | 101 | 13 | 10 | 10 | 26 | ○ |
| Example 16 | 91 | 95 | 20 | 24 | 0.45 | 0.37 | 49 | 0.3 | 104 | 132 | 9 | 8 | 8 | 25 | ◎ |
| Example 17 | 64 | 88 | 13 | 18 | 0.68 | 0.55 | 23 | 1.2 | 106 | 102 | 14 | 13 | 12 | 24 | ◎ |
| Example 18 | 64 | 88 | 13 | 18 | 0.68 | 0.55 | 10 | 0.2 | 104 | 118 | 10 | 11 | 10 | 65 | ◎ |
| Example 19 | 89 | 94 | 25 | 27 | 0.55 | 0.54 | 30 | 1.2 | 99 | 98 | 20 | 19 | 18 | 29 | ◎ |
| Example 20 | 89 | 94 | 24 | 27 | 0.55 | 0.54 | 16 | 0.2 | 101 | 118 | 22 | 20 | 20 | 68 | ◎ |
| Example 21 | 56 | 89 | 18 | 17 | 0.54 | 0.51 | 17 | 1.5 | 106 | 100 | 16 | 14 | 11 | 40 | ◎ |

TABLE 2

| | Monomer conversion | | Graft ratio | | ηsp/c | | | | | | GLOSS | | | Y.I. | Outer |
| | First step | After completion of polymerization | First step | After completion of polymerization | First step | After completion of polymerization | IZOD | M.I. | R | V.S.T. | 200° C. | 250° C. | 270° C. | 200° C. | appearance |
|---|---|---|---|---|---|---|---|---|---|---|---|---|---|---|---|
| Comparative Example 1 | — | 92 | — | 35 | — | 0.50 | 25 | 1.7 | 108 | 103 | 93 | 85 | 82 | 24 | ◎ |
| Comparative Example 2 | — | — | — | — | — | — | 16 | 1.3 | 106 | 100 | 40 | 39 | 44 | 38 | # |

TABLE 2-continued

| | Monomer conversion | | Graft ratio | | ηsp/c | | | | | | GLOSS | | | Y.I. | Outer appearance |
| | First step | After completion of polymerization | First step | After completion of polymerization | First step | After completion of polymerization | IZOD | M.I. | R | V.S.T. | 200° C. | 250° C. | 270° C. | 200° C. | |
|---|---|---|---|---|---|---|---|---|---|---|---|---|---|---|---|
| Comparative Example 3 | 89 | 94 | 18 | 27 | 0.43 | 0.45 | 25 | 2.3 | 105 | 103 | 72 | 70 | 67 | 26 | ⊚ |
| Comparative Example 4 | — | 92 | — | 35 | — | 0.50 | 14 | 1.2 | 98 | 99 | 37 | 42 | 58 | 42 | X |
| Comparative Example 5 | — | 92 | — | 35 | — | 0.50 | 7 | 1.3 | 102 | 97 | 33 | 35 | 40 | 19 | X |
| Comparative Example 6 | 85 | 95 | 22 | 37 | 0.55 | 0.52 | 22 | 1.6 | 106 | 101 | 58 | 56 | 47 | 27 | ⊚ |
| Comparative Example 7 | 93 | 94 | 35 | 24 | 0.61 | 0.59 | 5 | 1.8 | 105 | 101 | 23 | 21 | 15 | 24 | O |
| Comparative Example 8 | 93 | 94 | 35 | 24 | 0.61 | 0.59 | 3 | 0.2 | 105 | 118 | 37 | 38 | 35 | 65 | O |
| Comparative Example 9 | — | 95 | — | 25 | — | 0.56 | 20 | 1.4 | 107 | 103 | 85 | 23 | 21 | 32 | ⊚ |
| Comparative Example 10 | — | 95 | — | 25 | — | 0.56 | 15 | 0.1 | 106 | 119 | 85 | 56 | 30 | 68 | ⊚ |
| Comparative Example 11 | 66 | 92 | 18 | 49 | 0.32 | 0.25 | 13 | 2.3 | 106 | 101 | 86 | 78 | 48 | 23 | ⊚ |
| Comparative Example 12 | 66 | 92 | 18 | 49 | 0.32 | 0.25 | 7 | 0.3 | 105 | 120 | 80 | 70 | 52 | 75 | ⊚ |
| Comparative Example 13 | 68 | 95 | 10 | 35 | 0.37 | 0.38 | 34 | 1.2 | 98 | 100 | 35 | 28 | 26 | 29 | ⊚ |
| Comparative Example 14 | 69 | 95 | 10 | 35 | 0.37 | 0.38 | 10 | 0.2 | 95 | 121 | 48 | 36 | 29 | 67 | X |

As is evident from the foregoing descriptions and Examples, the low gloss thermoplastic resins according to the method of the present invention exhibit an excellent delustered outer appearance without deterioration of their molding processability or mechanical properties, and thus present superior effects that they are useful particularly as molding materials in the fields where the impact resistance and high flow properties are required, such as large size thin wall molded products including particularly parts for automobiles.

We claim:

1. A process for producing a low gloss thermoplastic resin, by emulsion polymerizing in two steps (A) 20 to 70 parts by weight of butadiene polymer having an average particle size of at least 0.05 μm and a gel content of at most 60% by weight, at least 70% by weight of which consists of butadiene, with (B) from 30 to 80 parts by weight of a total of (i) from 15 to 40% by weight of a vinyl cyanide monomer and (ii) from 60 to 85% by weight of an aromatic vinyl monomer, which process consists essentially of:
  (a) reacting from 30 to 70% by weight of the entire butadiene polymer with from 30 to 70% by weight of the entire vinyl cyanide monomer and from 30 to 70% by weight of the entire aromatic vinyl monomer until a monomer conversion of at least 56% is obtained, thereby effecting grafting of the monomers to the butadiene polymer to form a latex; and then
  (b) charging and reacting the remaining portions of the butadiene polymer, vinyl cyanide monomer and aromatic vinyl monomer, thereby effecting partial grafting of said monomers to the butadiene polymer, to render the formed partially grafted copolymer capable of agglomeration when heated, thereby imparting a low gloss to said thermoplastic resin.

2. The process according to claim 1, wherein the aromatic vinyl monomer in the first step is α-methylstyrene.

3. The process according to claim 1, which process comprises polymerizing in two steps from (A) 30 to 60 parts by weight of a butadiene polymer, at least 70% by weight of which consists of butadiene, with (B) from 40 to 70 parts by weight of a total of (i) from 15 to 40% by weight of a vinyl cyanide monomer and (ii) from 60 to 85% by weight of an aromatic vinyl monomer.

4. The process according to claim 1, wherein said butadiene polymer is selected from the group consisting of polybutadiene, butadiene-styrene copolymer, butadiene-acrylonitrile copolymer and polyisoprene.

5. The process according to claim 1, wherein said vinyl cyanide monomer is selected from the group consisting of acrylonitrile, methacrylonitrile, ethacrylonitrile and fumaronitrile.

6. The process according to claim 5, wherein said vinyl cyanide monomer is acrylonitrile.

7. The process according to claim 1, wherein said aromatic vinyl monomer is selected from the group consisting of styrene, α-methylstyrene, o-methylstyrene, 1,3-dimethylstyrene, p-methylstyrene, p-t-butylstyrene, halogenated styrene and p-ethylstyrene.

* * * * *